United States Patent [19]
Henry et al.

[11] Patent Number: 5,828,800
[45] Date of Patent: Oct. 27, 1998

[54] SELF-ALIGNED MECHANICAL M×N OPTICAL SWITCH

[75] Inventors: Charles Howard Henry, Skillman; Herman Melvin Presby, Highland Park, both of N.J.

[73] Assignee: Lucent Technologies Inc., Murray Hill, N.J.

[21] Appl. No.: 880,702

[22] Filed: Jun. 23, 1997

[51] Int. Cl.⁶ ............................................ G02B 6/26
[52] U.S. Cl. ........................ 385/20; 385/16; 385/25; 385/43; 385/49; 385/50
[58] Field of Search .................. 385/20, 21, 16, 385/25, 49, 50, 52, 129, 43

[56] References Cited

U.S. PATENT DOCUMENTS

| | | | |
|---|---|---|---|
| 4,639,074 | 1/1987 | Murphy | 385/49 |
| 4,725,114 | 2/1988 | Murphy | 385/59 |
| 4,762,387 | 8/1988 | Baldorf et al. | 385/71 |
| 5,159,649 | 10/1992 | Uemura et al. | 385/21 |
| 5,177,804 | 1/1993 | Shimizu et al. | 385/20 |
| 5,185,825 | 2/1993 | Shigematsu et al. | 385/20 |
| 5,455,878 | 10/1995 | Thaniyavarn | 385/20 |
| 5,461,683 | 10/1995 | Harman | 385/21 |
| 5,483,608 | 1/1996 | Yokomachi et al. | 385/22 |
| 5,500,917 | 3/1996 | Daniel et al. | 385/99 |
| 5,612,815 | 3/1997 | Labeye et al. | 385/20 |
| 5,623,564 | 4/1997 | Presby | 385/20 |

OTHER PUBLICATIONS

N. Kashima, *Passive Optical Components for Optical Fiber Transmission*, ch. 13, pp. 307–325 (Artech House 1995).

C.H. Henry et al., "Glass Waveguides on Silicon for Hybrid Optical Packaging," 7 J. Lightwave Technol., pp. 1530–1539, Oct. 1989.

Z. Weissman et al. "Modes of Periodically Segmented Waveguides," J. Lightwave Technol. vol. 11, No. 11, pp. 1831–1838, Nov. 1993.

E.J. Murphy, "Fiber Attachment for Guided Wave Devices", *J. of Lightwave Technol.*, vol. 6, No. 6, pp. 862–871, Jun. 1988.

K. Shiraishi et al., "Beam Expanding Fiber Using Thermal Diffusion of the Dopant", *J. of Lightwave Technol.*, vol. 8, No. 8, Aug. 1990.

H. Hanafusa et al., "Thermally–Diffused Expanded Core Fibres For Low–Loss And Inexpensive Photonic Components", *Electronic Letters*, vol. 27, No. 21, pp. 1968–1969, Oct. 1991.

*Primary Examiner*—Hemang Sanghavi
*Attorney, Agent, or Firm*—Robert E. Rudnick

[57] ABSTRACT

A mechanically stable self-aligned M×N optical switch having a low insertion loss is achieved by employing three cleaved silica optical structures containing a plurality of waveguides. A monolithic silica optical structure is cleaved into the three corresponding structures. Each of the first and third structures has a cleaved edge and a respective set of waveguides extending parallel to a corresponding structure surface. The second structure has two substantially parallel cleaved edges and a plurality of sets of waveguides extending parallel to a corresponding structure surface. The corresponding surfaces of the first, second and third structures are positioned on, for example, surfaces of respective first, second and third bases aligned in a common plane. The structures are further positioned with the cleaved edges of the second structure arranged adjacent to and facing respective ones of the cleaved edges of the first and third structures. In operation, the second structure is moveable in a direction along the cleaved edges relative to the first and third structures to selectively align different waveguide sets with the waveguides of the first and third structures to provide various different optical connections between the waveguide sets of the first and third structures.

23 Claims, 3 Drawing Sheets

SELF-ALIGNED MECHANICAL M×N OPTICAL SWITCH

RELATED U.S. PATENT

The invention is related to commonly assigned U.S. Pat. No. 5,623,564, entitled "Self-Aligned Mechanical Optical Switch", which issued on Apr. 22, 1997, to one of the inventor of the present invention and which is incorporated by reference herein.

FIELD OF THE INVENTION

The invention relates to optical signal routing and more specifically to a mechanical M×N optical switch configuration with enhanced waveguide alignment and routing capability.

BACKGROUND OF THE INVENTION

Optical switches have several applications in fiber-optic communication systems. Mechanical optical switches have been used in those switching applications which do not require very high speed switching and which are wavelength and polarization independent. For example, mechanical optical switches have been used in optical fiber routing applications to switch between particular optical signal paths to provide reliable fiber transmission routes for carrying optical signal information. Also, mechanical optical switches are used to provide connection between each one of a plurality of optical fibers and measuring equipment for testing optical fiber routes and/or components connected to the optical fibers.

A variety of mechanical optical switch configurations are commercially available and typically characterized as either optical-component-moving-type or fiber-moving-type switch configurations. Examples of these types of such configurations are provided in N. Kashima, *Passive Optical Components for Optical Fiber Transmission*, ch. 13, pp. 307–325 (Artech House 1995), which is incorporated by reference herein. Examples of optical-component-moving-type switches include configurations that employ moveable mirrors or prisms to selectively redirect light signals from an end of a first optical fiber into an end of a second optical fiber wherein the optical fibers are arranged in a parallel manner with their ends adjacent to each other. A similar switch employs an opaque moveable stop that is selectively inserted between ends of optical fibers that face one another. However, known optical-component moving-type switches typically operate as an on-off switches or 1×2 switches and are incapable of providing multiple-port switching, such as M input to N output, i.e., M×N, switching applications.

Conventional fiber-moving-type switches typically provide multiple-port switching but are mechanically complex, expensive and most have poor alignment requiring frequent adjustment. For example, one known fiber-moving-type switch configuration uses a moveable fiber connector plug having guide pins, and an array of fixed fiber connector receiver plugs having pin receptacles. In operation, the moveable plug is roughly transported to a desired position to mate with a fixed plug and then precisely aligned by pushing it into the fixed plug to insert the guide pins into the receptacles. This complex and expensive switch configuration is described in greater detail in the above cited Kashima reference.

A fiber-moving-type switch manufactured by Dicon Fiber Optics, Inc., Berkeley, California, has a configuration based on expanding a beam of light from optical fibers using grated index (GRIN) rod lens. The optical fibers and lens are mounted on a wheel which rotates a desired fiber into a position in which the beam of light is collected with another lens that focuses it onto a receiving optical fiber. Such a switch configuration is expensive to assemble and requires relatively high alignment tolerances and correspondingly requires frequent adjustment.

Accordingly, there is a recognized need for simple, low cost, mechanically stable optical switches that are capable of providing multiple-port switching operations.

SUMMARY OF THE INVENTION

The previously-cited U.S. Pat. No. 5,623,564 is directed to a mechanically stable self-aligned optical switch having a low insertion loss that uses two silica optical structures formed by cleaving a monolithic silica optical structure containing a plurality of waveguides. The monolithic silica optical structure is cleaved across the waveguides contained therein to produce waveguide ends at the respective cleaved edges. The waveguides in each of the cleaved structures extend parallel to a corresponding particular surface of the structure. In one embodiment, the corresponding particular surfaces of the cleaved structures are positioned on respective surfaces of first and second bases aligned in a common plane such that the structures' cleaved edges are adjacent to and facing one another.

In this manner, the waveguides of the cleaved structures are effectively self-aligned in the direction normal to the common plane of the corresponding base surfaces. The use of silica optical structures cleaved from a monolithic silica optical structure advantageously facilitates the self-alignment. As a result, no further alignment is required in the direction normal to the common plane of the waveguides. In operation, one cleaved structure is moveable relative to the other structure in the direction along the cleaved edges to selectively provide connections between the waveguides in each structure as well as alignment in a directional parallel to the plane of the corresponding surfaces of the bases. It is possible to implement a variety of switch configurations including M×N switch configurations.

However, the present invention provides further enhanced M×N optical signal routing options in a mechanical optical switch while employing the advantageous self-alignment achieved using cleaved silica optical structures. More specifically, a monolithic silica optical structure is cleaved into three corresponding structures. Each of the first and third structures has a cleaved edge and a respective set of waveguides extending parallel to a corresponding structure surface. The second structure has two substantially parallel cleaved edges and a plurality of sets of waveguides extending parallel to a corresponding structure surface. The corresponding surfaces of the first, second and third structures are positioned on, for example, reference surfaces of respective first, second and third bases aligned in a common plane. The structures are further positioned with the cleaved edges of the second structure arranged adjacent to and facing respective ones of the cleaved edges of the first and third structures.

In operation, the second structure is moveable in a direction along the cleaved edges relative to the first and third structures to selectively align different waveguide sets between the waveguides of the first and third structures to provide different corresponding optical connections between the waveguide sets of the first and third structures. The three cleaved silica optical structures of the invention facilitates enhanced routing options between respective sets of optical switch inputs and outputs compared to the switch of the U.S. Pat. No. 5,623,564.

Further, it is optionally possible for at least one of the waveguide sets in the second structure to have a waveguide that intersects with another waveguide. This intersecting of the waveguides in the second structure advantageously provides a crossing over of optical routing paths and enables even further enhanced optical signal routing options in a switch having compact dimensions and relatively low insertion loss.

Additional features and advantages of the present invention will become more readily apparent from the following detailed description and accompanying drawings.

DETAILED DESCRIPTION

The present invention is based on the discovery that it is possible to produce a mechanical optical switch having enhanced M×N optical signal routing capabilities as well as advantageous self-alignment using three silica optical structures cleaved from a monolithic silica optical structure. More specifically, a monolithic silica optical structure having optical waveguides formed therein and extending parallel to a particular surface of the structure is cleaved along two substantially parallel lines to form the three corresponding structures. Each of the resulting first and third structures has a cleaved edge and a respective set of waveguides extending parallel to their particular surfaces. The resulting second structure has two substantially parallel cleaved edges and a plurality of sets of waveguides extending parallel to its particular surface. The particular surfaces of the first, second and third structures are positioned on a reference surface of at least one base disposed in a particular plane. The structures are further positioned with the cleaved edges of the second structure arranged adjacent to and facing the respective cleaved edges of the first and third structures.

In operation, the second structure is moveable in a direction along the parallel cleaved edges relative to the first and third structures to selectively align different waveguide sets of the second structure with the respective waveguides of the first and third structures for providing various different optical connections between the waveguides of the first and third structures. It is optionally possible for at least one of the waveguide sets in the second structure to have a waveguide that intersects with another waveguide. This intersecting of the waveguides in the second structure advantageously provides a crossing of optical routing paths and enables the even further enhanced optical signal routing options in a switch having compact dimensions and relatively low insertion loss.

Figure 1:
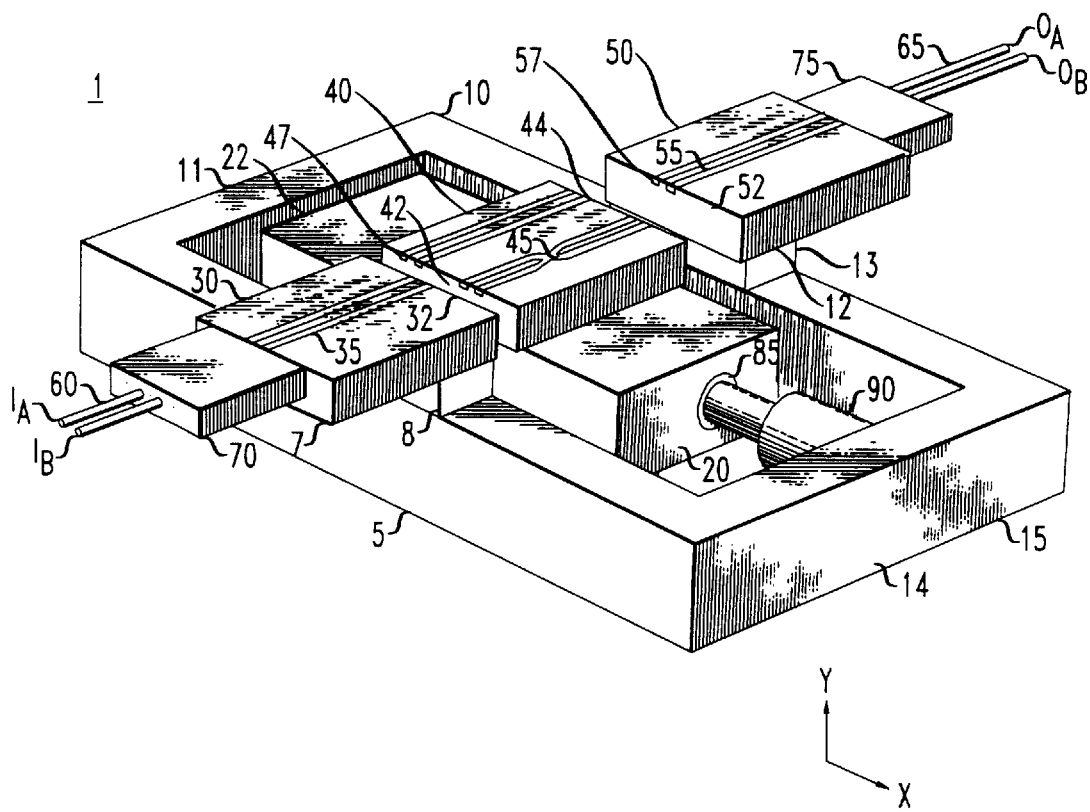
FIG. 1 is a perspective view of an exemplary 2×2 self-aligned mechanical optical switch in accordance with the present invention.
Figure 2:
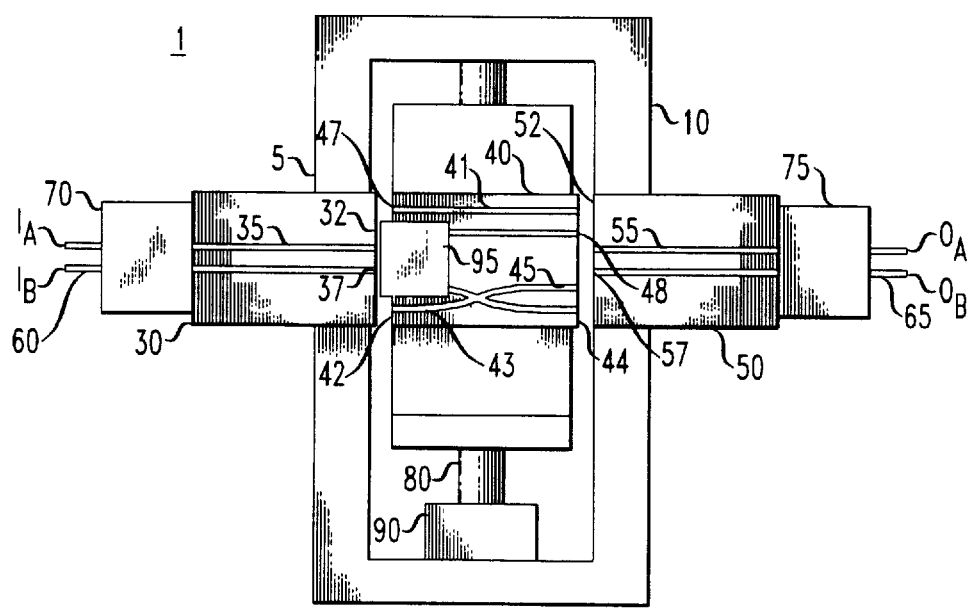
FIG. 2 is a top view of the switch of FIG. 1.

An exemplary mechanical optical switch 1 in accordance with the invention is shown in FIGS. 1 and 2. The switch 1 includes a first and second fixed bases 5 and 10 formed integral with or secured to a mounting bracket 15. A moveable base 20 is movably attached to the mounting bracket 15 so as to move the base 20 in a direction X parallel to the fixed bases 5 and 10. The bases 5, 10 and 20 have flat reference surfaces 7, 12 and 22 that are in a common plane with one another. The surfaces 7 and 12 are top surfaces of spacers 8 and 13 of the fixed bases 5 and 10. One suitable technique for ensuring that surfaces 7, 12 and 22 are in a common plane is, for example, to simultaneously machine or plane both surfaces.

Silica optical structures 30, 40 and 50 containing respective sets of planar waveguides 35, 45 and 55 are disposed on the flat surfaces 7, 12 and 22 of the bases 5, 10 and 20. The waveguides 35, 45 and 55 are disposed in a common plane parallel to bottom surfaces of the structures 30, 40 and 50 that are in contact with the base reference surfaces 7, 12 and 22, respectively. Accordingly, since the reference surfaces 7, 12 and 22 of the bases 5, 10 and 20 are in a common plane, the waveguides 35, 45 and 55 in the structures 30, 40 and 50 are likewise maintained in common plane in the switch 1. Thus, the waveguides 35, 45 and 55 are aligned with one another in a direction Y normal to the reference surfaces 7, 12 and 22.

In accordance with the invention, the silica optical structures 30, 40 and 50 are cleaved from a monolithic silica optical structure to advantageously achieve the alignment of the waveguides 35, 45 and 55 in a common plane. An exemplary suitable monolithic silica optical structure is described in greater detail below with regard to FIG. 3. In FIGS. 1 and 2, the silica optical structure 40 has waveguide ends 47 and 48 at respective cleaved edges 42 and 44. The structures 30 and 50 have corresponding waveguide ends 37 and 57 at cleaved edges 32 and 52. The structures 30, 40 and 50 are arranged on the bases 5, 10 and 20 with the cleaved edges 32 and 42, and 44 and 52 close to and facing one another along the X-direction as is shown in FIGS. 1 and 2. Optical fibers 60 and 65 carry optical signals routed by the switch 1. Connectors 70 and 75 connect the optical fibers 60 and 65 to the waveguides 35 and 55 of the silica optical structures 30 and 50. Suitable connectors 70 and 75 include, for example, fiber connection chips available from Lucent Technologies Network Cable Systems, of Atlanta, Ga.

The silica optical structures 30, 40 and 50 are mounted on the bases 5, 10 and 20 with their cleaved edges 32 and 42, and 44 and 52 as close together as possible. It is advantageous for each gap separation between the cleaved edges 32 and 42, and 44 and 52 to be less than 10 $\mu$m for conveying ligh;t signals between waveguides of the respective structures 30, 40 and 50 in order to maintain low insertion losses of approximately less than 0.5 dB. It is further advantageous for the cleaved edges to be polished to further reduce insertion loss. In order to further reduce insertion loss, an index matching material, such as in a gel or liquid form, can be disposed in the gaps between the cleaved edges 32 and 42, and 44 and 52. A suitable index matching liquid is available from Cargille Scientific, Inc., of Cedar Grove, N.J.

Also, it is possible to form the facing cleaved edges 32 and 42, and 44 and 52 at a complementary angle to a line extending normal to the common plane of the base reference surfaces 7, 12 and 22 with the facing cleaved edge surfaces 32 and 42, and 44 and 52 remaining parallel to one another in order to minimize any back reflections. Suitable complementary angles are in the range of approximately 5° to 15°. It is also possible to provide an anti-reflection (AR) coating on the facing cleaved edge surfaces 32, 42, 44 and/or 52 to reduce back reflections. Exemplary AR coatings include quarter-wavelength thick coatings of magnesium or calcium fluoride.

It is advantageous for the second silica optical structures 40 to contain a greater number of waveguide sets than the first and third silica optical structures 30 and 50 to provide enhanced routing options between waveguides 35 and 55 in the first and third structures. For example, the switch 1 of FIGS. 1 and 2 is a 2×2 switch that employs two waveguide sets 41 and 43 in the second structure 40 to enable four routing options between two inputs and two outputs, designated by reference symbols $I_A$ and $I_B$ and $O_A$ and $O_B$, respectively. It is possible to produce the four different routing paths or connections between the inputs $I_A$ and $I_B$ and outputs $O_A$ and $O_B$ by precisely moving the base 20 and the second structure 40 in the X-direction to align the respective ones of the waveguides ends 37 and 47, and 48 and 57 for the desired routing connection. The four routing options are 1) $I_A \leftarrow\rightarrow O_A$ alone; 2) $I_B \leftarrow\rightarrow O_B$ alone; 3) $I_A \leftarrow\rightarrow O_A$ simultaneously with $I_B \leftarrow\rightarrow O_B$ and 4) $I_A \leftarrow\rightarrow O_B$ simultaneously with $I_B \leftarrow\rightarrow O_A$.

The particular mechanism and method selected to move the base 20 in the X-direction is not critical to practicing the invention and a variety of conventional methods are suitable. An exemplary screw-drive arrangement for moving the base 20 is shown in FIGS. 1 and 2 for illustration purposes only and is not meant to be limitation of the present invention. The illustrated screw-drive mechanism includes a threaded shaft 80 that is rotatably attached to a first end 11 of the bracket 15 and extends through an internally-threaded sleeve 85 of the base 20, seen in FIG. 1. The shaft 80 is further attached to a controllable motor 90, best seen in FIG. 2, which is secured to a second end 14 of the mounting bracket 15. The motor 90 rotates the threaded shaft 80 causing the threaded sleeve 20 to travel across the threads of the shaft 25. As a result, the moveable base 20 also moves along the shaft 80 in the X-direction. The motor 90 enables precise control of the position of the moveable base 20 and silica optical structure 40 in the X-direction by controlling the number of rotations of the shaft 80. Suitable motors for the motor 90 include, for example, D.C. and stepper motors.

The particular motor controller (not shown) chosen to control the motor 90 for positioning the base 20 to produce the various waveguide connections and alignment in the X-direction is not critical for practicing the invention. A suitable motor controller is, for example, a conventional computer, such as a personal computer, with the appropriate hardware and/or software for providing the motor 90 with the necessary movement instructions. In addition, it is possible for the motor controller to determine and achieve the proper alignment in the X-direction by monitoring the amount of stray light that is deflected at either or both of the cleaved edges 32 and 42, and 44 and 52 due to a misalignment. Accordingly, an optional light detector 95, such as a pin diode, is shown in FIG. 2 mounted above the cleaved edge 42 to monitor stray light. For illustration purposes, the optional light detector 95 is not shown in FIG. 1.

Although the switch 1 is shown using the spacers 8 and 13 to provide the flat surfaces 7 and 17 that are in a common plane with the moveable base flat surface 22, it should be readily understood that other mechanical configurations can be used to provide the flat surfaces 7 and 17 in practicing the invention. For example, it is possible to provide the flat surfaces 7, 17 and 22 a greater or lesser number of spacers associated with the bases 5, 10 and 20 or the omission of spacers where corresponding mounting portions of the bases are in the same plane.

Figure 3:
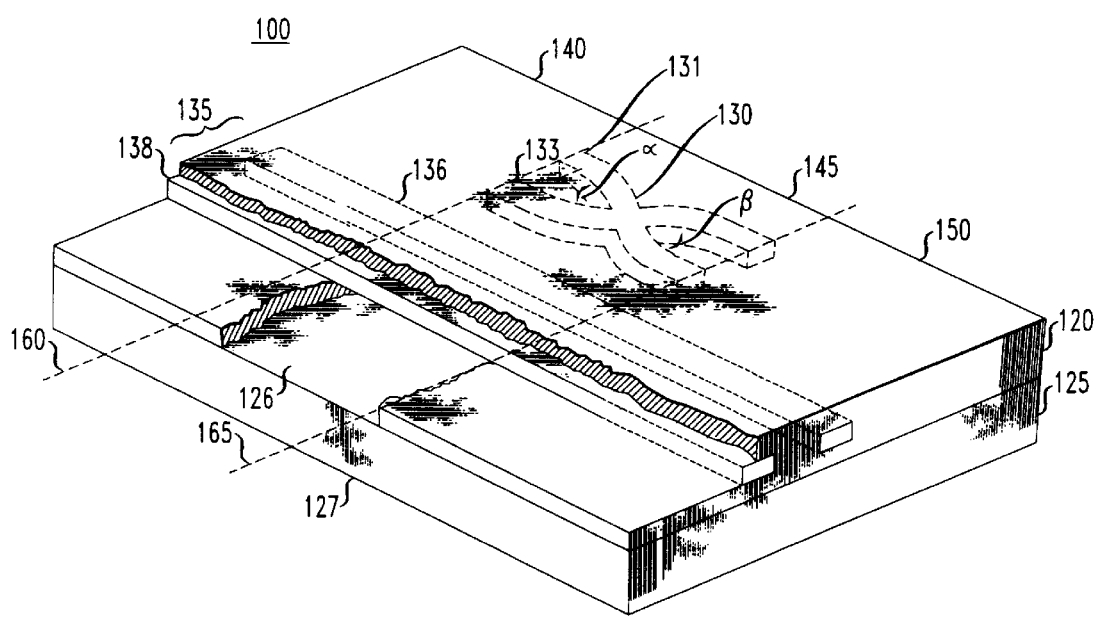
FIG. 3 is perspective partial cut-away view of a exemplary monolithic silica optical structure that can be used to form cleaved optical silica structures in the switch of FIGS. 1 and 2.

An exemplary monolithic silica optical structure 100 for use in forming the silica optical structures 30, 40 and 50 is shown in FIG. 3. The silica optical structure 100 has silica ($SiO_2$) glass 120 formed on a substrate 125, such as a silicon wafer substrate. The silicon substrate 125 provides a foundation having a substantially flat top and bottom surfaces 126 and 127 upon which a waveguide structure can be formed and can have a thickness, for example, on the order of 0.5 mm. While the proceeding description relates to silica on silicon waveguide devices, it should be understood that it is possible to fabricate the structure 100 on other substrate materials such as fused quartz, lithium niobate or ceramic.

Waveguide sets 130 and 135 containing respective waveguides 131 and 133, and 136 and 138 are formed within the silica glass 120 to produce the exemplary 2×2 switch of FIGS. 1 and 2. Waveguide 131, 133, 136 and 138 are formed within the silica glass 120 to produce the desired waveguide sets in first, second and third portions 140, 145 and 150 of the structure 100 that will be used for the first, second and third optical structures 5, 10 and 20 of FIGS. 1 and 2. Waveguides 130 and 131 extend across the structure 100 and are used to form the respective waveguide sets 35 and 55 in the first and third cleaved structures 30 and 50, as well as the first waveguide set 41 in the second cleaved structure 40 of FIGS. 1 and 2. The waveguide 131 intersects with, and extends through, the waveguide 133 to form the second waveguide set 43 in the second cleaved structure 40 of FIGS. 1 and 2.

Fabrication techniques, such as lithography, etching, low pressure vapor chemical deposition, and flame hydrolysis, are useful in fabricating the waveguide sets 130 and 135. An exemplary fabrication process for the silica optical circuit 100 is as follows: a base layer of silica glass is deposited on the substrate 125, and a thin core layer of doped silica glass is deposited on this silica glass layer; the core layer is then configured to the desired waveguide structures 131 and 133, and 136 and 138 using standard photolithographic techniques; and a layer of doped silica glass is then deposited over the core layer to act as a top cladding. A suitable doping profile for the doped silica glass is uniform step-index distribution.

Suitable thicknesses for the base silica layer, core layer and top cladding layer are 10 to 20 $\mu$m, 4 to 8 $\mu$m and 0 to 20 $\mu$m, respectively. Thicknesses less than 10 $\mu$m for the base silica layer are undesirable because of light loss to the substrate while thickness greater than 20 $\mu$m are generally disadvantageous because of long deposition times required to form such thicknesses. For a detailed discussion of glass waveguides on silicon and the fabrication thereof, see, for example, C. H. Henry et al., "Glass Waveguides on Silicon for Hybrid Optical Packaging", 7J *Lightwave Technol.*, pp. 1530–1539 (1989), which is incorporated by reference herein. Although the above exemplary fabrication method produces waveguides within the silica glass 120 that are completely buried, it is possible to fabricate such waveguides within the silica glass 120 near a silica glass top surface 140 or which are only partially buried.

The waveguides 131, 133, 136 and 138 extend through the silica glass 120 substantially parallel to the bottom surface 127 of the silica optical structure 100. In order to form the silica optical structures 30, 40 and 50 of FIGS. 1 and 2, the respective portions 140, 145 and 150 are cleaved from the silica optical structure 100 along parallel cleave lines indicated by dashed lines 160 and 165 in FIG. 3. Suitable cleaving methods include, for example, sawing with a diamond blade dicing saw or diamond scribing and then bending to produce the structure separation or any other method of separating the structures 30, 40 and 50 from a common structure.

Since the waveguide set 130 containing waveguides 131 and 133 is only employed in the second structure 40 of FIGS. 1 and 2, it need only be formed across the second portion 145 of the structure 100 in FIG. 3. However, it is possible for the waveguides 131 and 133 to extend beyond the cleave lines 160 and 165 into the first and third portions 140 and 150 without degrading performance of the resulting switch 1 of FIGS. 1 and 2. Further, the waveguides 131 and 133 intersect to advantageously enable enhanced cross-over routing of $I_A \leftarrow \rightarrow O_B$ and $I_B \leftarrow \rightarrow O_A$, individually or simultaneously. The relative angle separations α and β between waveguides sections leading into, and out of, the intersection determine the extent of undesirable coupling of a power of an optical signal entering the intersection from one waveguide section to exit through the undesired one of the output waveguide sections. The use of relative angle separations α and β of approximately 5° or greater typically maintains such undesired coupling advantageously to 0.5 dB or less.

Although FIGS. 1–3 depict waveguide sets that include intersecting waveguides to achieve the cross-over routing and enhanced routing options, it is alternatively possible to employ only sets of non-intersecting waveguides in the second structure according to the invention.

The separation between each waveguide within the respective waveguides 37 and 42 is not critical for practicing the invention. However, waveguides positioned relatively close together require smaller movement to make switch connections resulting in faster switching times. It is generally desirable that the separation be greater than 20 μm to enhance stray light rejection of adjacent waveguides. Further, the waveguide separation can conveniently be 250 μm proximate the connectors 70 and 75 of FIGS. 1 and 2 because such separation is a standard separation employed in commercially available fiber connection chips. Accordingly, it is possible to accomplish faster switching times by forming the waveguides 37 and 42 having relatively small separation distances such as, for example, on the order of 10 μm to 50 μm in the regions proximate the cleaved edges while maintaining a separation distance of 250 μm in the first and third silica optical structures 30 and 50 proximate the connectors 70 and 75 to enable the use of commercially available fiber connection chips.

Since the waveguides 131, 133, 136 and 138 are precisely formed within the silica glass 120 to extend parallel to the bottom flat substrate surface 127, the resulting waveguide ends 47 and 48 at the cleaved edges 42 and 44 of the second cleaved structure 40 and the respective waveguide ends 37 and 57 at the cleaved edges 32 and 52 of the first and third cleaved structures 30 and 50 are aligned in the Y-direction when the cleaved structures 30, 40 and 50 are positioned on the aligned base reference surfaces 7, 17 and 22, as shown in FIG. 1. The desired switch routing signal path or paths and alignment in the X-direction are achieved by movement of the moveable base 20. The desired alignment resolution is attained by selecting the appropriate thread spacing of the shaft 80 and rotation resolution of the motor 85, shown in FIG. 1. Although each of the waveguides 131, 133, 136 and 138 is shown parallel to the bottom surface 127 along their entire length, it should be understood that the waveguides need only be parallel to the bottom surface 127 in the regions where the structure 100 is to be cleaved.

The use of three silica optical structures facilitates numerous individual or simultaneous routing options between an input and an output set of optical fibers waveguides for optical signals that can be implemented in a switch have relatively compact dimensions and low insertion loss. The exemplary 2×2 switch structure of FIGS. 1 to 3 with four routing options has been shown for illustration purposes only and is not meant to be a limitation of the invention. It is possible in accordance with the invention for the three cleaved silica optical structures to employ waveguide arrangements for a 2×2 switch structure having a lessor number of routing options, or an M×N switch having greater or lessor number of routing options wherein at least one of the values M or N is greater than 2.

Figure 4:
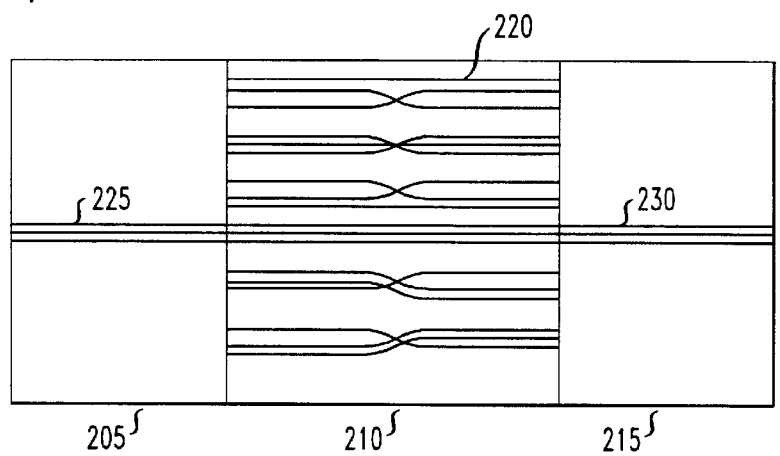
FIG. 4 is a top view of exemplary cleaved silica optical structures for producing a 3×3 mechanical optical switch according to the invention.

FIG. 4 depicts a top view of exemplary cleaved silica optical structures 205, 210 and 215 for a 3×3 optical switch to further illustrate the advantageous enhanced routing options available with intersecting waveguides according to the invention. It is possible for the three cleaved silica optical structures 205, 210 and 215 to be positioned in a common plane on at least one base reference surface. For example, these structures 205, 210 and 215 can be employed instead of the structures 30, 40 and 50 of FIGS. 1 and 2 to produce a switch with advantageously six different routing options. The second cleaved structure 210 employs six sets 220 of waveguides relative to the single set of waveguides 225 and 230 in the first and third structures 205 and 215 for advantageously enabling these six different routing options. Such different routing options are achieved by movement of the second structure 210 in a direction along the parallel cleaved edges to align respective ones of the waveguide sets 220 with the waveguides 225 and 230 in the structures 205 and 215.

The exemplary optical switch embodiments depicted in FIGS. 1–4 employ the same number of inputs and outputs for illustration purposes only and is not meant to be a limitation of the invention. It should be readily understood that the numbers of waveguides in the first and third structures can differ in a switch according to the invention. In a similar manner, the use of the same separation distances between waveguides in the first and third silica optical structures in FIGS. 1–4 have been shown for ease of illustration and is not critical to practicing the invention. It is possible to employ different separation distances between waveguides in the first and third structures as well as between waveguides within the first and third structures. In such arrangements, the waveguide sets in the second structures should be formed so as to provide the required waveguide separation distances and alignment at the respective cleaved edges for the waveguide separation distances used in the first and third structures.

Figure 5A:
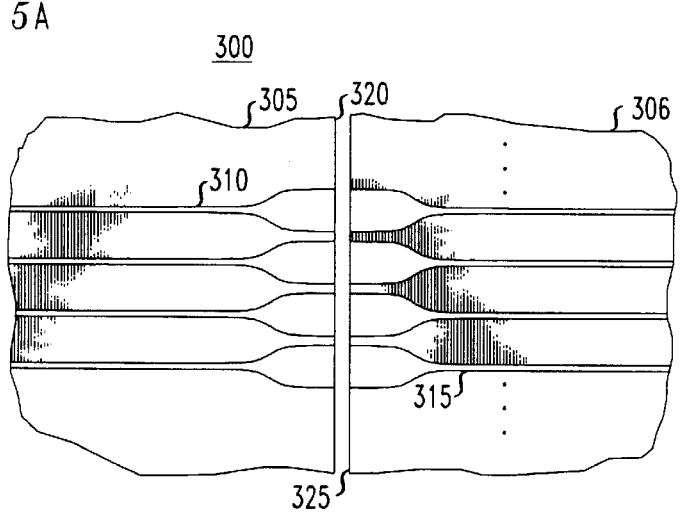
FIGS. 5A and 5B are top views of portions of alternative exemplary silica optical structures to the silica optical structure of FIG. 3.
Figure 5B:
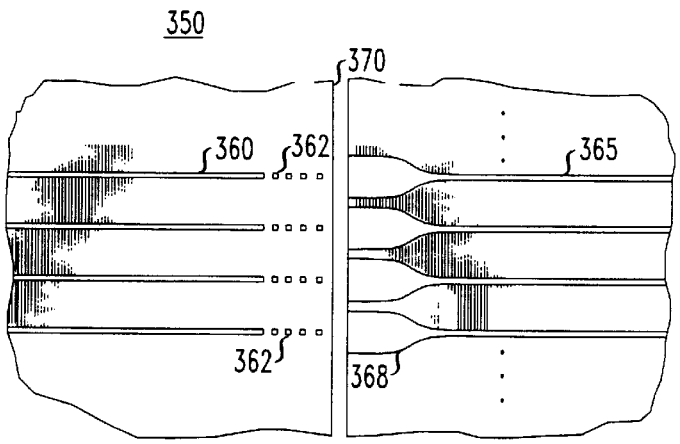

Further, it is possible to employ different waveguide configurations proximate the cleaved edges to enable a reduction in the required alignment tolerances in the direction along the cleaved edges for switch connections while maintaining adequate insertion loss. FIGS. 5A and 5B illustrate different exemplary waveguide configurations useable proximate the cleaved edges at the gaps between the silica optical structures 30 and 40, and/or the gap between structures 40 and 50 of FIGS. 1 and 2. The illustration of the waveguide configuration proximate only one of the two set of facing cleaved edges in a switch according to the invention is for illustration purposes only. It should be readily understood that it is possible to employ such waveguide configurations at both or either of the sets of facing cleaved edges according to the invention.

Silica optical structures pairs 300 and 350 in FIGS. 5A and 5B were cleaved from corresponding monolithic silica optical structures in a substantially similar manner to that described above with regard to FIG. 3. Waveguides in the structure pairs 300 and 350 expand an optical signal propagating therein proximate the corresponding cleaved edge to reduce the alignment tolerances required for switch connections. More specifically, in FIG. 5A, the first waveguides 310 in a first structure 305 are tapered outwardly near a cleaved edge 320 to expand a propagating optical signal at a waveguide region near the cleaved edge 320. Waveguides 315 in a corresponding cleaved structure 306 are also tapered near a corresponding cleaved edge 325 to provide an enlarged collection area for receiving the expanded beam of light. Suitable increases in the waveguide diameter for the tapers are, for example, approximately in the range of 10% to 50%. An increase of greater than 50% in waveguides for the taper is generally undesirable because of corresponding increased loss. In operation, the tapered waveguides of the silica optical structure pairs 300 permit the use of lower alignment tolerances for waveguide connections than with non-tapered waveguides.

In a similar manner, waveguides 360 in the silica optical structure pairs 350 of FIG. 5B expand a beam of light by using a series of waveguide segments 362 near a cleaved edge 370. The segments 362 create sufficient discontinuities to expand the beam of light. A suitable number of segments is, for example, on the order of 50. It is possible for each of the segments to have a length in the range of several microns and, likewise, the separation between the segments to be in the range of several microns. A more detailed description of expanding a beam of light using a segmented waveguide is provided in Z. Weissman and A. Hardy, "Modes of Periodically Segmented Waveguides," *J Lightwave Technol.*, vol. 11, no. 11, pp. 1831–1838, (1993), which is incorporated by reference herein. Tapered waveguide ends 368 of the waveguides 365 collect the expanded beam of light from the segmented waveguides 360.

Although several embodiments of the invention have been described in detail above, many modifications can be made without departing from the teaching thereof. All of such modifications are intended to be encompassed within the following claims. For instance, in an alternative embodiment of the invention, a fixed base is substituted for the moveable base 20. A reference surface of this fixed base is arranged in a common plane with the reference surfaces 7 and 12 of the fixed bases 5 and 10. The silica optical structure 40 is then movably disposed on the second fixed base surface. In operation, the silica optical structure 40 is moved across the reference surface of the fixed base in order to form the waveguide connections. In a similar manner, it is possible to alternatively employ at least one fixed base having a surface in a single plane instead of the three fixed bases in such an embodiment.

In a corresponding manner, it is possible to substitute a moveable base for one or both of the fixed bases 5 and 10 according to the invention to enable the movement of two or all three cleaved silica optical structures relative to one another to achieve the desired optical fiber connections. Further, it is possible to cleave a monolithic silica optical circuit along more than two parallel cleave lines to produce more than three silica optical structures for forming a switch in accordance with the invention, wherein at least two of the cleaved structures are moveable relative to the other cleaved structures to produce the desired waveguide connections.

The invention claimed is:

1. A mechanical optical switch comprising:
   first, second and third silica optical structures cleaved from a monolithic silica optical structure having waveguides extending parallel to a particular structure surface, each of the first and third structures having a corresponding cleaved edge and a respective set of waveguides extending parallel to the particular surface, the second structure having two substantially parallel cleaved edges and a plurality of sets of waveguides extending parallel to the particular surface; and
   at least one base having a respective reference surface disposed in a plane, the particular surfaces of the first, second and third structures positioned on the reference surface of the at least one base with the cleaved edges of the second structure positioned adjacent to and facing respective ones of the cleaved edges of the first and third structures, wherein the second structure is moveable in a direction along the cleaved edges relative to the first and third structures to selectively provide optical connections between waveguides of the first and third structures.

2. The switch of claim 1 wherein at least one of the waveguide sets in the second structure has a waveguide that intersects with another waveguide in the set.

3. The switch of claim 2 wherein the intersecting waveguides intersect at an angle of no less than approximately 10°.

4. The switch of claim 1 wherein the at least base comprises first, second and third bases having the respective reference surfaces disposed in the plane, and wherein the first, second and third structures are positioned on the respective reference surfaces of the first, second and third bases.

5. The switch of claim 4 wherein the second base is a moveable base and wherein the second structure is fixed to the second base.

6. The switch of claim 5 wherein the first and third bases are fixed to a bracket and wherein the moveable base is movably mounted to the bracket.

7. The switch of claim 4 wherein the first and third bases are formed integral with one another.

8. The switch of claim 1 wherein at least one of the silica optical structures has at least one waveguide tapered proximate the cleaved edge.

9. The switch of claim 1 wherein at least one of the silica optical structures has at least one waveguide segmented proximate the cleaved edge.

10. The switch of claim 1 wherein a gap between at least one group of the facing cleaved edges of the structures is no greater than 10 $\mu$m.

11. The switch of claim 10 further comprising an index matching material disposed in the gap.

12. The switch of claim 1 further comprising a light detector proximate a gap between at least one group of the facing cleaved edges of the structures.

13. The switch of claim 1 wherein the cleaved edges of at least one of the cleaved structures is polished.

14. A mechanical optical switch comprising:
    first, second and third bases, the second base having a reference surface aligned in a common plane with corresponding reference surfaces of the first and third bases;
    first, second and third silica optical structures cleaved from a monolithic silica optical structure having waveguides formed therein extending parallel to a particular surface, each of the first and third structures having a corresponding cleaved edge and a respective set of waveguides extending parallel to the reference surface, the second structure having two substantially parallel cleaved edges and a plurality of sets of waveguides extending parallel to the surface; and the corresponding surfaces of the first, second and third structures arranged on the particular surfaces of the respective first, second and third bases with the cleaved edges of the second structure positioned adjacent to and facing respective ones of the cleaved edges of the first and third structures, wherein the second structure is moveable in a direction along the cleaved edges relative to the first and third structures to selectively provide optical connections between waveguides of the first and third structures.

15. The switch of claim 14 wherein at least one of the waveguide sets in the second structure has a waveguide that intersects with another waveguide.

16. The switch of claim 15 wherein the intersecting waveguides intersect at an angle of no less than approximately 10°.

17. A method of producing a mechanical optical switch comprising:

cleaving a monolithic silica optical structure into first, second and third silica optical structures, each of the first and third structures having a corresponding cleaved edge and a respective set of waveguides extending parallel to a corresponding structure surface, the second structure having two substantially parallel cleaved edges and a plurality of sets of waveguides extending parallel to a corresponding structure surface; and positioning the first, second and third structures on a reference surface of at least one base disposed in a particular plane with the cleaved edges of the second structure positioned adjacent to and facing respective ones of the cleaved edges of the first and third structures, wherein the second structure is moveable in a direction along the cleaved edges relative to the first and third structures to selectively provide optical connections between waveguides of the first and third structures.

18. The method of claim 17 wherein the step of positioning the structures on the at least one base produces a gap between at least one of the facing cleaved edges of the structures that is no greater than approximately 10 μm.

19. The method of claim 17 further comprising disposing a refractive index matching material in either of the gaps.

20. The method of claim 17 further comprising detecting a misalignment of the waveguides by detecting stray light at the gap between the cleaved edges.

21. The method of claim 17 wherein the step of positioning the structures on the at least one bases comprises fixing said structures to respective ones of first, second and third bases.

22. The method of claim 21 wherein the second base is a moveable base and the step of positioning the second structure on the second base comprising fixing the second structure to the second base.

23. The method of claim 17 further comprising the step of polishing the cleaved edges of at least one of the cleaved structures.

* * * * *